United States Patent
Morioka

(10) Patent No.: US 11,252,758 B2
(45) Date of Patent: Feb. 15, 2022

(54) INFORMATION PROCESSING APPARATUS, AND SIGNAL TRANSMISSION CONTROL METHOD

(71) Applicant: Sony Corporation, Tokyo (JP)

(72) Inventor: Yuichi Morioka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/324,579

(22) PCT Filed: Jul. 19, 2017

(86) PCT No.: PCT/JP2017/026026
§ 371 (c)(1),
(2) Date: Feb. 11, 2019

(87) PCT Pub. No.: WO2018/078966
PCT Pub. Date: May 3, 2018

(65) Prior Publication Data
US 2019/0182869 A1    Jun. 13, 2019

(30) Foreign Application Priority Data

Oct. 24, 2016  (JP) .............................. JP2016-207984

(51) Int. Cl.
*H04W 74/08*    (2009.01)
*H04B 17/318*   (2015.01)

(52) U.S. Cl.
CPC ...... *H04W 74/0816* (2013.01); *H04B 17/318* (2015.01); *H04W 74/0808* (2013.01)

(58) Field of Classification Search
CPC ......... H04W 74/0816; H04W 74/0808; H04W 72/082; H04W 52/24; H04W 16/14; H04B 17/318; H04B 17/336
See application file for complete search history.

(56) References Cited

U.S. PATENT DOCUMENTS

| | | | |
|---|---|---|---|
| 2015/0124744 A1 | 5/2015 | Zhu et al. | |
| 2016/0150534 A1* | 5/2016 | Kwon | H04W 72/0446 370/338 |
| 2017/0347376 A1* | 11/2017 | Sakai | H04W 74/0825 |

FOREIGN PATENT DOCUMENTS

| | | |
|---|---|---|
| JP | 2010193446 A | 9/2010 |
| JP | 2016-503998 A | 2/2016 |

(Continued)

OTHER PUBLICATIONS

James Wang (Mediatek): "Spatial Re-Use OA-CCA and SR Field," IEEE Draft; 11-16-0699-00-00AX-Spatial-Re-Use-OA-CCA-and-SR-Field, IEEE-SA Mentor, Piscataway, NJ USA vol. 802.11ax, May 17, 2016 (May 17, 2016, pp. 1-24 (Year: 2016).*

(Continued)

*Primary Examiner* — Elton Williams
(74) *Attorney, Agent, or Firm* — Xsensus, LLP

(57) ABSTRACT

To improve utilization efficiency of media by an information processing apparatus in a situation where a plurality of networks is adjacent to each other.

An information processing apparatus includes: a measuring unit; a judging unit; and a control unit. In the information processing apparatus, the measuring unit measures signal strength of a received signal. The judging unit judges whether or not later signal transmission is possible using a relative value with respect to the signal strength measured by the measuring unit as a threshold on the basis of the threshold. The control unit controls signal transmission in accordance with the judgment by the judging unit about whether or not signal transmission is possible.

9 Claims, 17 Drawing Sheets

(56) References Cited

FOREIGN PATENT DOCUMENTS

KR        20160062113  A    6/2016
WO    WO-2016037364  A1    3/2016

OTHER PUBLICATIONS

Extended Search Report issued in European Application 17863439.0-1215 dated Aug. 13, 2019.
Wang, J, et al., "Spatial Re-Use OA-CCA Mode and SR Field Discussion", IEEE Draft, 24 Pages total, (May 2016).
Tagaki et al., "Dynamics CCA control and TPC Simulation Results with SS1~SS3", Sep. 2015, 54 pages.
International Search Report dated Oct. 10, 2017 for PCT/JP2017/026026 filed on Jul. 19, 2017, 8 pages including English Translation.
Dynamic CCA control and TPC Simulation Results with SS1-SS3; IEEE 802.1115/1045r0; 11-15-1045-01-00; ax-dynamic-cca-control-and-tpc-simulation-results-with-ss1-ss3; May 14, 2016.
Spatial Re-Use OA-CCA Mode and SR Field Discussion: IEEE 802.11-16/0699; James Wang (Mediatek):May 16, 2016.

\* cited by examiner

FIG. 13

| L-STF | L-LTF | L-SIG | RL-SIG | HE-SIG-A | HE-SIG-B | HE-STF | HE-LTF |
|---|---|---|---|---|---|---|---|

| FIELD | EXPLANATION |
|---|---|
| DL/UL | LINK DIRECTION (DOWNLINK / UPLINK) |
| Format | PPDU FORMAT |
| BSS Color | BSS IDENTIFIER |
| Spatial Reuse | SPATIAL REUSE INFORMATION |
| TXOP Duration | REMAINING PERIOD OF CHANNEL OCCUPATION PERIOD |
| Bandwidth | BANDWIDTH |
| MCS | MODULATION AND CODING SCHEME |
| CP+LTF Size | SIZE OF CYCLIC PREFIX (CP) AND LONG TRAINING FIELD (LTF) |
| Coding | CODING RATE |
| Nsts | NUMBER OF SPACE-TIME STREAMS (sts) |
| STBC | WHETHER OR NOT SPACE-TIME BLOCK CODING (STBC) IS PERFORMED |
| TxBF | WHETHER OR NOT TRANSMISSION BEAMFORMING (TxBF) IS PERFORMED |
| DCM | WHETHER OR NOT DUAL CARRIER MODULATION (DCM) IS PERFORMED |
| Packet Extension | PACKET EXTENSION |
| Beam Change | WHETHER OR NOT THERE IS CHANGE OF PRE-CODER BETWEEN L-LTF AND HE-LTF |
| Doppler | WHETHER OR NOT THERE IS DOPPLER RESISTANCE |

INFORMATION PROCESSING APPARATUS, AND SIGNAL TRANSMISSION CONTROL METHOD

CROSS-REFERENCE TO RELATED APPLICATIONS

The present application is based on PCT filing PCT/JP2017/026026, filed Jul. 19, 2017, and claims priority to 2016-207984, filed in the Japanese Patent Office on Oct. 24, 2016, the entire contents of each of which are being incorporated herein by reference.

TECHNICAL FIELD

The present technology relates to an information processing apparatus which transmits and receives signals using a wireless network. More specifically, the present technology relates to an information processing apparatus which performs signal transmission control in accordance with a signal received from another apparatus, and a signal transmission control method thereof.

BACKGROUND ART

In a wireless network, signals are transmitted and received among a plurality of information processing apparatuses via a wireless network. To avoid collision in the wireless network, each of the information processing apparatuses judges whether a state of a medium is a busy state or an idle state. As a scheme for the judgment, there is a carrier sense multiple access/collision avoidance (CSMA/CA) scheme. In this CSMA/CA scheme, each of the information processing apparatuses detects a medium upon transmission of a signal, and determines a state of the medium on the basis of a predetermined threshold. For example, a method in which an average amount of energy is measured, and a method in which a preamble is detected and decoded are known (see, for example, Patent Literature 1).

CITATION LIST

Patent Literature

Patent Literature 1: JP 2016-503998T

DISCLOSURE OF INVENTION

Technical Problem

It is assumed in the above-described related art that a common medium is utilized within one wireless network, and in the case where a value of the medium exceeds a threshold, the state is determined as a busy state. However, in a situation where a plurality of networks is adjacent to each other, because a state of the medium is determined as a busy state even in the case where the medium can be utilized as a different medium, there can be a possibility that utilization efficiency of the media may degrade.

The present technology has been made in view of such circumstances, and is directed to improving utilization efficiency of media in a situation where a plurality of networks is adjacent to each other.

Solution to Problem

The present technology has been devised to solve the problem described above, a first aspect thereof is an information processing apparatus including: a judging unit configured to judge whether or not later signal transmission is possible using a relative value with respect to signal strength of a received signal as a threshold. By this means, an effect is provided that a new threshold is provided on the basis of the signal strength of the received signal, and whether or not signal transmission is possible is judged in accordance with the new threshold.

In addition, according to this first aspect, the signal strength may be signal strength of a signal from another network. By this means, an effect is provided that a new threshold is provided on the basis of the signal strength of the signal from another network, and whether or not signal transmission is possible is judged in accordance with the new threshold.

In addition, according to this first aspect, the signal strength may be signal strength in a case where a signal front another network does not exceed predetermined strength. By this means, an effect is provided that a new threshold is provided on the basis of the signal strength in the case where the signal from another network does not exceed the predetermined strength, and whether or not signal transmission is possible is judged in accordance with the new threshold.

In addition, according to this first aspect, the relative value with respect to the signal strength of the received signal may be a value for detecting signal strength in a case where it is assumed that a signal from within an own network is added to signal strength of a signal from another network. By this means, an effect is provided that, in the case where a signal from within the own network is added, the addition of the signal is detected.

In addition, according to this first aspect, the judging unit may include a signal strength holding unit configured to hold the signal strength of the signal from the other network, an assumed incremental value holding unit configured to hold an incremental value assumed as signal strength of the signal from within the own network, and an adding unit configured to add the signal strength of the signal from the other network held in the signal strength holding unit and the incremental value held in the assumed incremental value holding unit to generate the threshold. By this means, an effect is provided that an incremental value assumed as the signal strength of the signal from within the own network is held in advance, and, in the case where the signal from within the own network is added, the addition of the signal is detected.

In addition, according to this first aspect, the judging unit may judge whether or not signal transmission is possible using the relative value as a threshold during a period while a signal from another network occupies a medium. By this means, an effect is provided that, in the case where a signal from within the own network is added to the signal from another network, the addition of the signal is detected.

In addition, according to this first aspect, in a case where the signal strength of the received signal exceeds a first threshold and a network identifier included in the received signal indicates another network, if the signal strength of the received signal does not exceed a second threshold, the judging unit may judge whether or not signal transmission is possible using a relative value with respect to the signal strength of the received signal as the threshold while the signal is received. By this means, an effect is provided that, in the case where the signal from another network satisfies a predetermined condition, in the case where the signal from within the own network is added, the addition of the signal is detected.

In addition, a second aspect of the present technology is an information processing apparatus including: a measuring unit configured to measure signal strength of a received signal; a judging unit configured to judge whether or not later signal transmission is possible using a relative value with respect to the measured signal strength as a threshold; and a control unit configured to control signal transmission in accordance with the judgment. By this means, an effect is provided that the signal strength of the received signal is measured, a new threshold is provided on the basis of the measured signal strength, and whether or not signal transmission is possible is judged in accordance with the new threshold.

In addition, a third aspect of the present technology is a signal transmission control method including: a step of acquiring signal strength of a received signal by a measuring unit; a step of generating a relative value with respect to the signal strength as a threshold by a threshold generating unit; and a step of judging whether or not signal transmission is possible using the threshold by a judging unit. By this means, an effect is provided that the signal strength of the received signal is measured, a new threshold is provided on the basis of the measured signal strength, and whether or not signal transmission is possible is judged in accordance with the new threshold.

Advantageous Effects of Invention

According to the present technology, it is possible to provide excellent effects that it is possible to improve utilization efficiency of media in a situation where a plurality of networks is adjacent to each other. Note that the effects of the present technology are not necessarily limited to the effects described herein and may be any effect described in the present disclosure.

BRIEF DESCRIPTION OF DRAWINGS

FIG. 13 is a diagram illustrating a field format of an HE-SIG-A in IEEE 802.11ax standards assumed in the embodiment of the present technology.

MODE(S) FOR CARRYING OUT THE INVENTION

An embodiment for implementing the present technology (hereinafter, referred to as an embodiment) will be described below. Description will be provided in the following order.
1. Embodiment (example of signal transmission control using a relative value with respect to signal strength of received signal as threshold)
2. Application example 1. Embodiment

[Configuration of Communication System]

Figure 1:
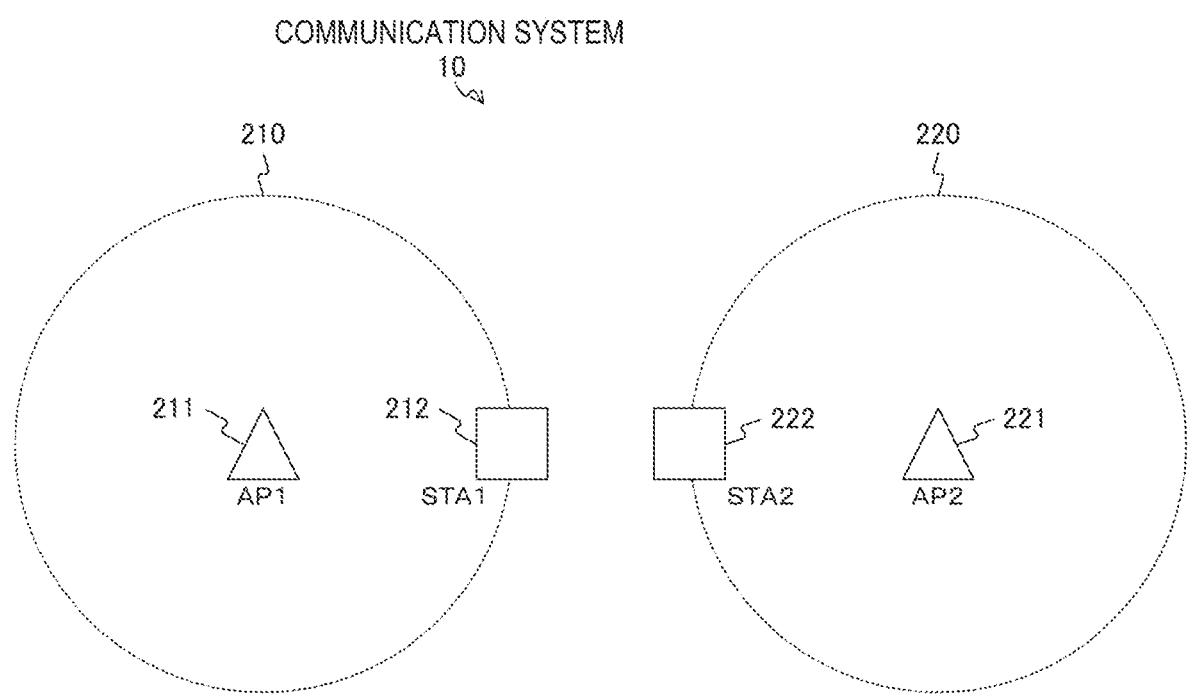
FIG. 1 is a diagram illustrating an entire configuration example of a communication system 10 in an embodiment of the present technology.

FIG. 1 is a diagram illustrating an entire configuration example of a communication system 10 in an embodiment of the present technology. In this communication system 10, a plurality of networks 210 and 220 is assumed. An access point #1 (AP 1) 211 is disposed in the network 210, and an access point #2 (AP 2) 221 is disposed in the network 220. These access points 211 and 221 can function as base stations in a wireless local area network (LAN) system.

The network 210 includes a communication terminal #1 (STA 1) 212. The communication terminal #1 (STA 1) 212 performs wireless communication with the access point #1 (AP 1) 211. The network 220 includes the communication terminal #2 (STA 2) 222. The communication terminal #2 (STA 2) 222 performs wireless communication with the access point #2 (AP 2) 221.

Each of the access points 211 and 221 and the communication terminals 212 and 222 is constituted as an information processing apparatus having a communication function. It is assumed that this information processing apparatus has a communication function conforming to wireless LAN standards of, for example, institute of electrical and electronic engineers (IEEE) 802.11. More specifically, a communication function conforming to the wireless LAN standards of IEEE 802.11ax can be assumed. In the standards, each of the networks 210 and 220 is referred to as a basic service set (BSS). As will be described later, a physical header in the standards includes a network identifier (BSS Color) which enables identification of each other's networks.

Note that, as another communication scheme, for example, wireless fidelity (Wi-Fi), Wi-Fi Direct, Wi-Fi CERTIFIED Miracast specifications (technical specification name: Wi-Fi Display), or the like, may be used. Further, it is also possible to make the information processing apparatus 100, for example, a device which supports multi user MIMO (MU-MIMO). In this case, the information processing apparatus 100 can simultaneously perform transmission to a plurality of devices. Further, in the case where the information processing apparatus 100 simultaneously performs transmission to a plurality of devices, the information processing apparatus 100 can receive clear to send (CTS) frames from the plurality of devices.

Figure 2:
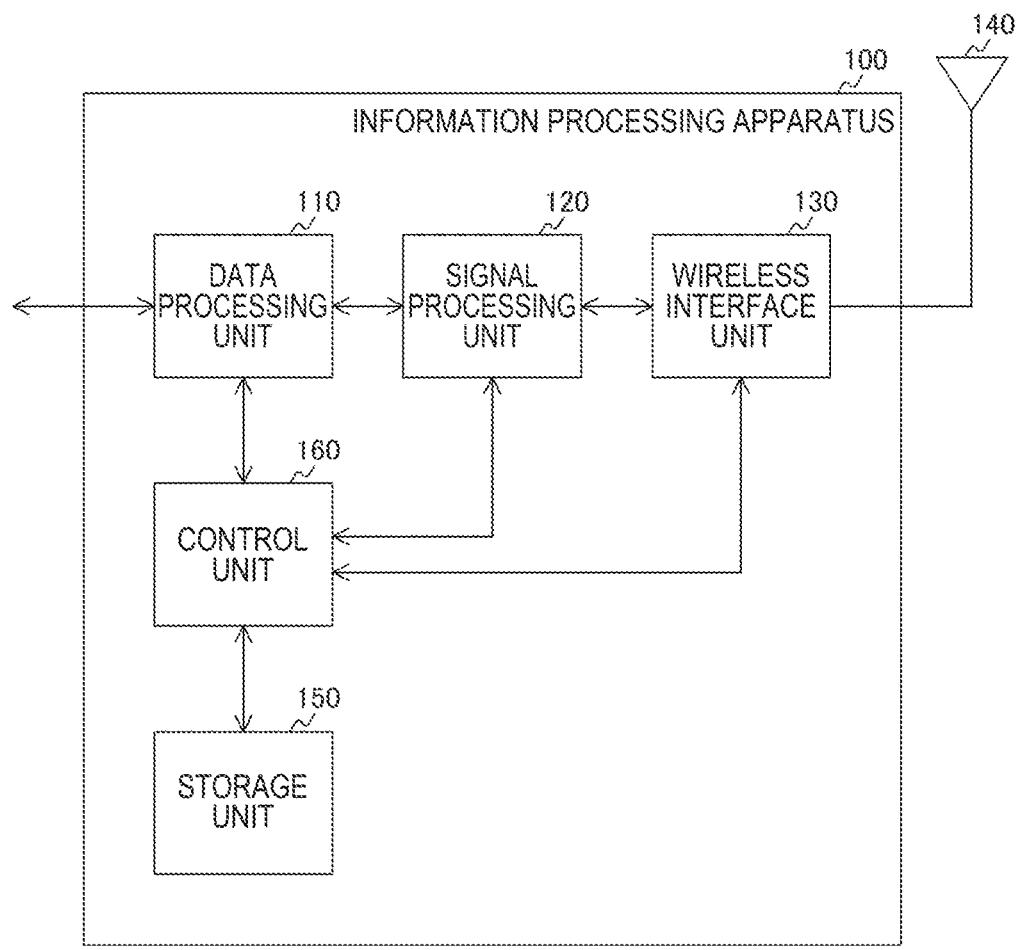
FIG. 2 is a block diagram illustrating a functional configuration example of an information processing apparatus 100 in the embodiment of the present technology.

FIG. 2 is a block diagram illustrating a functional configuration example of the information processing apparatus 100 in the embodiment of the present technology. As described above, the information processing apparatus 100 corresponds to the access points 211 and 221, the communication terminals 212 and 222, or the like.

The information processing apparatus 100 includes a data processing unit 110, a signal processing unit 120, a wireless interface unit 130, an antenna 140, a storage unit 150 and a control unit 160.

The wireless interface unit 130 is an interface for connecting to other information processing apparatuses using wireless communication and transmitting and receiving various kinds of information on the basis of control by the control unit 160. Upon transmission, this wireless interface unit 130 converts input from the signal processing unit 120 into an analog signal, amplifies and filters the analog signal, up-converts a frequency of the signal into a predetermined frequency, and sends out the signal to the antenna 140. Further, upon reception, the wireless interface unit 130 performs processing reverse to the processing upon transmission on input from the antenna 140 and supplies the processing result to the signal processing unit 120.

This wireless interface unit 130 has a function of measuring signal strength of a received signal. Note that the wireless interface unit 130 is an example of a measuring unit recited in the claims.

The signal processing unit 120 performs various kinds of signal processing on the basis of control by the control unit 160. Upon transmission, this signal processing unit 120 encodes input data from the data processing unit 110 on the basis of a coding and modulation scheme set by the control unit 160 and adds a preamble and a PHY header. Then, the signal processing unit 120 supplies a transmission symbol stream obtained through the signal processing to the wireless interface unit 130.

Further, upon reception, the signal processing unit 120 performs decoding processing on a received symbol stream received from the wireless interface unit 130 after detecting a preamble and a PHY header, and supplies the processing result to the data processing unit 110. Further, the signal processing unit 120 notifies the control unit 160 of the detection result of the PHY header, or the like.

This signal processing unit 120 includes a judging unit which judges whether or not signal transmission is possible in accordance with signal strength of a signal received from another information processing apparatus. Operation of this judging unit will be described later. Note that the signal processing unit 120 is an example of a judging unit recited in the claims.

The data processing unit 110 processes various kinds of data on the basis of control by the control unit 160. This data processing unit 110 performs processing of adding a media access control (MAC) header, an error detection code, or the like, to data from upper layers to generate a packet for wireless transmission. Then, the data processing unit 110 supplies the generated packet to the signal unit 120.

Further, upon reception of data, the data processing unit 110 performs processing of analyzing a header, detecting a packet error, or the like, on a bit sequence received from the signal processing unit 120 and supplies data subjected to the processing to upper layers. Further, the data processing unit 110 notifies the control unit 160 of the analysis result of a header, the detection result of a packet error, or the like.

The storage unit 150 has a role as a work area of data processing by the control unit 160 and a function as a storage medium which holds various kinds of data. As this storage unit 150, a storage medium such as, for example, a non-volatile memory, a magnetic disc, an optical disc and a magneto optical (MO) disc can be used. Note that, as the non-volatile memory, for example, an electrically erasable programmable read-only memory (EEPROM) or an erasable programmable ROM (EPROM) can be used. Further, as the magnetic disc, for example, a hard disc or a disc-shaped magnetic disc can be used. Still further, as the optical disc, for example, a compact disc (CD), a digital versatile disc recordable (DVD-R) or a Blu-ray (registered trademark) disc (BD) can be used.

The control unit 160 controls reception operation and transmission operation of each of the data processing unit 110, the signal processing unit 120 and the wireless interface unit 130. This control unit 160 performs, for example, passing of information between respective units, setting of communication parameters, scheduling of packets at the data processing unit 110, or the like. Further, this control unit 160 controls signal transmission in accordance with judgment by the judging unit at the signal processing unit 120. Note that the control unit 160 is an example of a control unit recited in the claims.

[Judgment as to Whether or Not Signal Transmission is Possible]

Figure 3:
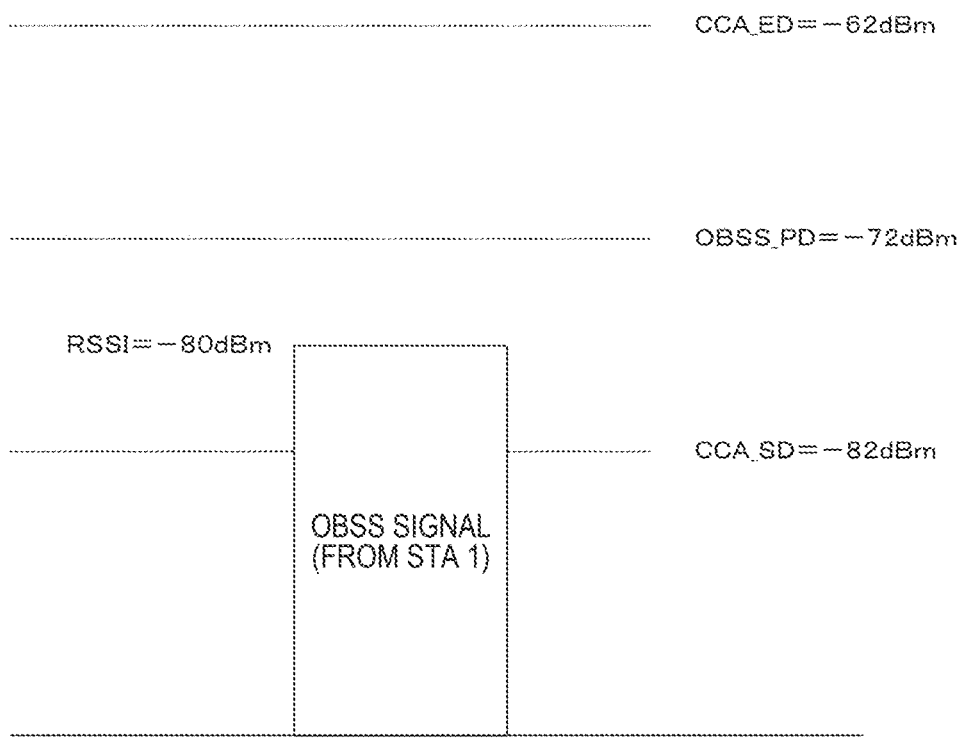
FIG. 3 is a diagram illustrating an example of signal strength of a signal received from another information processing apparatus and a threshold for judging whether or not signal transmission is possible.

FIG. 3 is a diagram illustrating an example of signal strength of a signal received from another information processing apparatus and a threshold for judging whether or not signal transmission is possible. FIG. 3 illustrates power on a vertical axis.

To avoid collision in the wireless network, each of the information processing apparatuses judges whether a state of a medium is a busy state or an idle state. As one of the schemes for judgement, there is a carrier sense multiple access/collision avoidance (CSMA/CA) scheme. In this CSMA/CA scheme, each of the information processing apparatuses detects a medium upon transmission of a signal and determines the state of the medium on the basis of a predetermined threshold.

In the IEEE 802.11ax standards, cooperative collision avoidance signal detect (CCA_SD) which is a signal detection threshold, is assumed as a threshold for the signal strength. In the case where signal strength of a signal received from another information processing apparatus exceeds the CCA_SD, the information processing apparatus which receives the signal judges that the medium is in a busy state and refrains from signal transmission in principle. Note that, while cooperative collision avoidance energy detect CCA_ED which is an energy detection threshold, is a threshold based on power detection, the CCA_ED is not particularly referred to in this example. Note that the signal detection threshold CCA_SD is an example of a first threshold recited in the claims.

It is assumed in this example that, when the communication terminal #2 (STA 2) 222 receives a signal from the communication terminal #1 (STA 1) 212, received signal strength indication (RSSI) which is signal strength of the signal is "−80 dBm". In this event, if the CCA_SD is set at "−82 dBm", because the signal strength of the received signal exceeds the CCA_SD, the communication terminal #2 (STA 2) 222 does not perform signal transmission in principle.

However, in the case where the communication terminals 222 and 212 belong to different networks, there is a possibility that, even if the communication terminal #2 (STA 2) 222 newly transmits a signal, such signal transmission does not become a problem at the information processing apparatus which is a destination of the signal from the communication terminal #1 (STA 1) 212.

Therefore, in the IEEE 802.11ax standards, it is studied to conditionally permit overlapping of networks. Adjacent networks in this case are referred to as an overlapping basic service set (OBSS). Then, as a threshold in the case where networks overlap with each other, overlapping basic service set packet detect (OBSS_PD) which is an OBSS threshold is assumed. Even in the case where the signal strength of the signal received from another information processing apparatus exceeds the CCA_SD, if the signal is a signal from another adjacent network and the signal strength does not exceed the OBSS_PD, it is judged that the medium is in an idle state. Note that the OBSS threshold OBSS_PD is an example of a second threshold recited in the claims.

In this example, the signal received by the communication terminal #2 (STA 2) 222 is a signal from the communication terminal #1 (STA 1) 212 in a different network 210, and if the OBSS_PD is set at "−72 dBm", signal strength of the received signal does not exceed the OBSS_PD. Therefore, the communication terminal #2 (STA 2) 222 judges that the medium is in an idle state, and can perform signal transmission.

Figure 4:
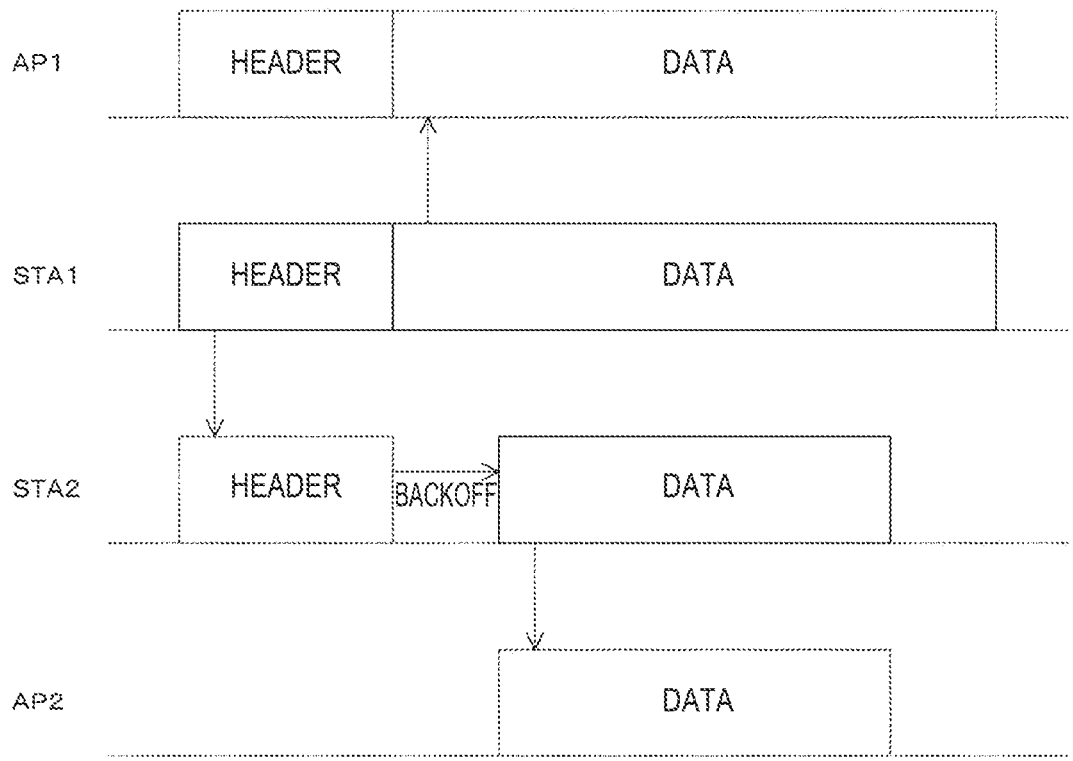
FIG. 4 is a diagram illustrating a first example of a packet sequence in the case where an OBSS threshold OBSS_PD is used.

FIG. 4 is a diagram illustrating a first example of a packet sequence in the case where the OBSS threshold OBSS_PD is used.

In this example, while the communication terminal #1 (STA 1) 212 transmits a packet to the access point #1 (AP 1) 211, the communication terminal #2 (STA 2) 222 tries to start signal transmission. The communication terminal #2 (STA 2) 222 performs carrier sense for judging the state of the medium prior to signal transmission. As a result, because the signal on the medium is a signal from another adjacent network, and the signal strength does not exceed the OBSS_PD, it is judged that the medium is in an idle state. Therefore, after a backoff period has elapsed, the communication terminal #2 (STA 2) 222 starts transmission of a packet to the access point #2 (AP 2) 221. By this means, signals from the both terminals are simultaneously transmitted in parallel, and it can be understood that frequency utilization efficiency is improved compared to a case where the signal detection threshold CCA_SD is used.

[Collision in OBSS]

Meanwhile, if such a signal from another adjacent network is permitted, the following problems can occur.

Figure 5:
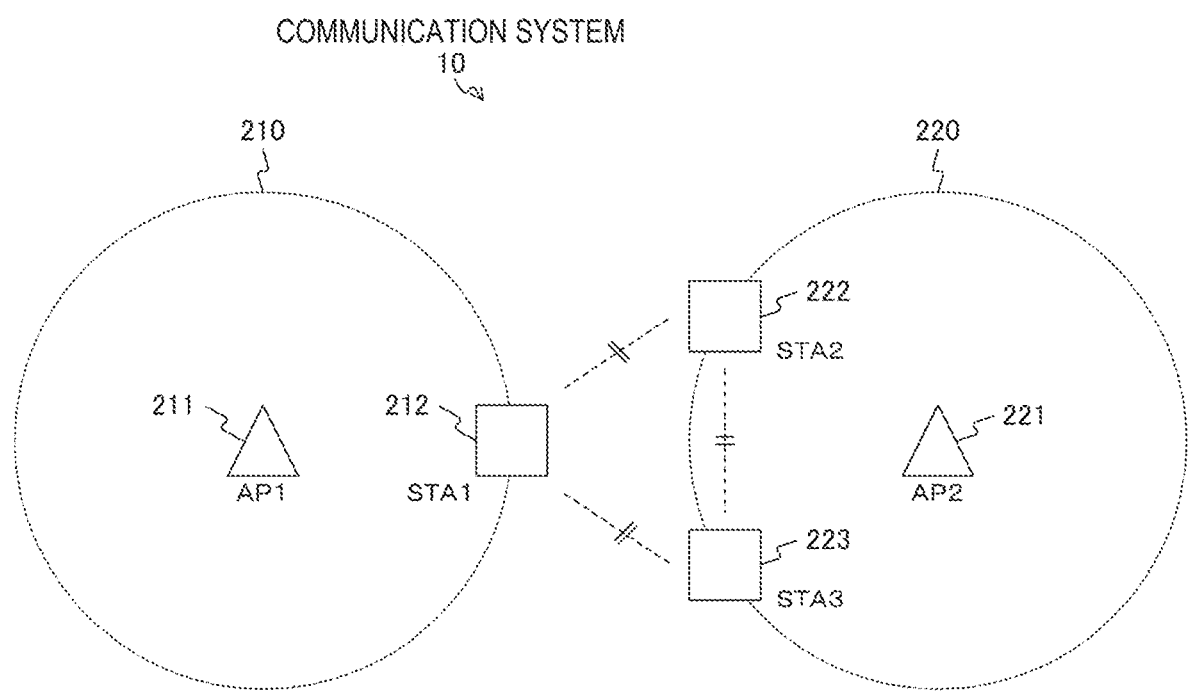
FIG. 5 is a diagram illustrating a first example of a topology in the communication system 10 in the embodiment of the present technology.

FIG. 5 is a diagram illustrating a first example of a topology in the communication system 10 in the embodiment of the present technology.

In this example, the communication terminal #1 (STA 1) 212 belongs to the network 210, and the communication terminal #2 (STA 2) 222 and the communication terminal #3 (STA 3) 223 belong to the network 220. Then, it is assumed that three communication terminals 212, 222 and 223 are arranged at regular intervals with respect to each other, and transmit signals at the same power.

Figure 6:
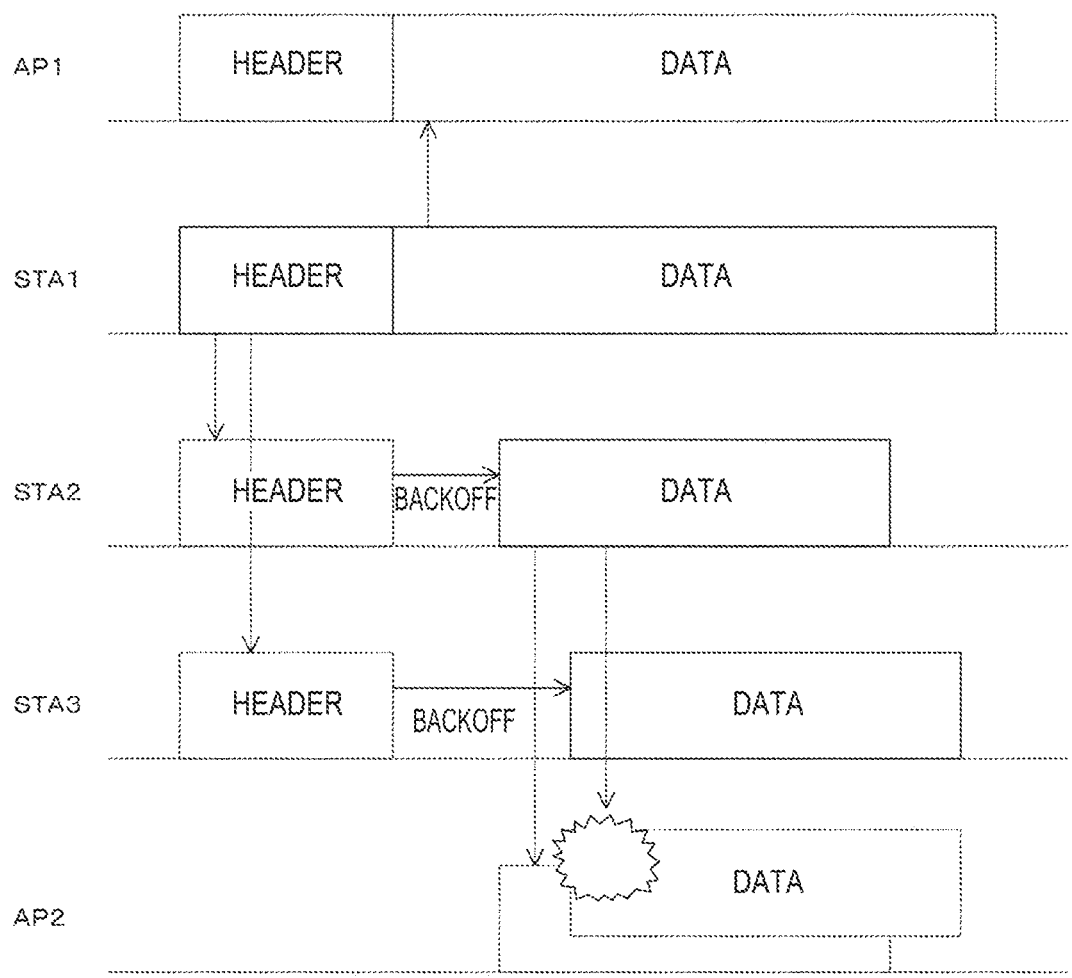
FIG. 6 is a diagram illustrating a second example of a packet sequence in the case where the OBSS threshold OBSS_PD is used.

FIG. 6 is a diagram illustrating a second example of a packet sequence in the case where the OBSS threshold OBSS_PD is used. In this example, the first example of the topology illustrated in FIG. 5 is assumed.

In this example, while the communication terminal #1 (STA 1) 212 transmits a packet to the access point #1 (AP 1) 211, the communication terminal #2 (STA 2) 222 and the communication terminal #3 (STA 3) 223 try to start signal transmission. The communication terminal #2 (STA 2) 222 and the communication terminal #3 (STA 3) 223 respectively perform carrier sense for judging the states of the media prior to signal transmission. As a result, each of the two communication terminals 222 and 223 judges that the medium is in an idle state because a signal on the medium is a signal from another adjacent network, and the signal strength does not exceed the OBSS_PD.

In this event, if a backoff period of the communication terminal #2 (STA 2) 222 is shorter, the communication terminal #2 (STA 2) 222 starts transmission of a packet to the access point #2 (AP 2) 221 first. Then, after the backoff period has elapsed, the communication terminal #3 (STA 3) 223 starts transmission of a packet to the access point #2 (AP 2) 221, and signals collide at the access point #2 (AP 2) 221. An example of the signal strength of the signal received at the communication terminal #3 (STA 3) 223 in this event is illustrated in FIG. 7.

Figure 7:
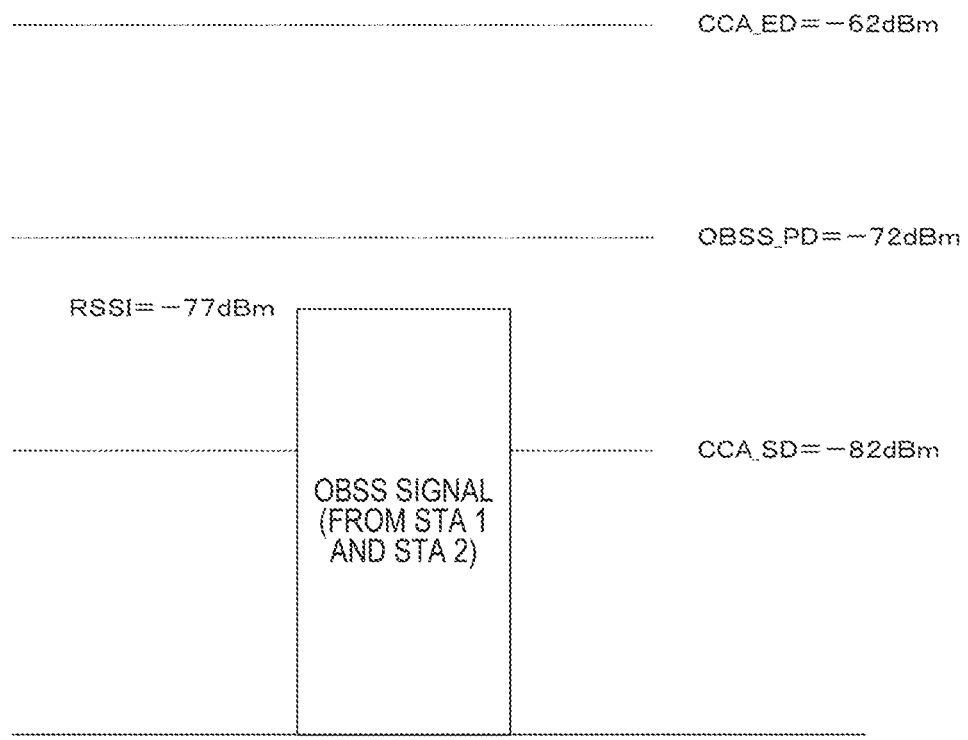
FIG. 7 is a diagram illustrating an example of signal strength of signals received by a communication terminal #3 (STA 3) 223 from a communication terminal #1 (STA 1) 212 and a communication terminal #2 (STA 2) 222 and a threshold for judging whether or not signal transmission is possible.

FIG. 7 is a diagram illustrating an example of the signal strength of the signals received by the communication terminal #3 (STA 3) 223 from the communication terminal #1 (STA 1) 212 and the communication terminal #2 (STA 2) 222 and a threshold for judging whether or not signal transmission is possible. It is assumed that the communication terminal #1 (STA 1) 212 and the communication terminal #2 (STA 2) 222 respectively transmit signals at the same power, and relative distances from the communication terminal #3 (STA 3) 223 are equal. In this event, power received by the communication terminal #3 (STA 3) 223 becomes double compared to power in the case where the signal is received only from the communication terminal #1 (STA 1) 212, and total power becomes "−77 dBm". Therefore, the communication terminal #3 (STA 3) 223 judges that the medium is in an idle state because the signal on the medium is a signal from another adjacent network, and the signal strength does not exceed the OBSS_PD, and continues backoff. By this means, the communication terminal #3 (STA 3) 223 also starts signal transmission as described above, and signals collide at the access point #2 (AP 2) 221.

Therefore, in the embodiment of the present technology, a new signal detection threshold is provided as described below to avoid such collision.

[Spatial Reuse Detection Threshold]

Figure 8:
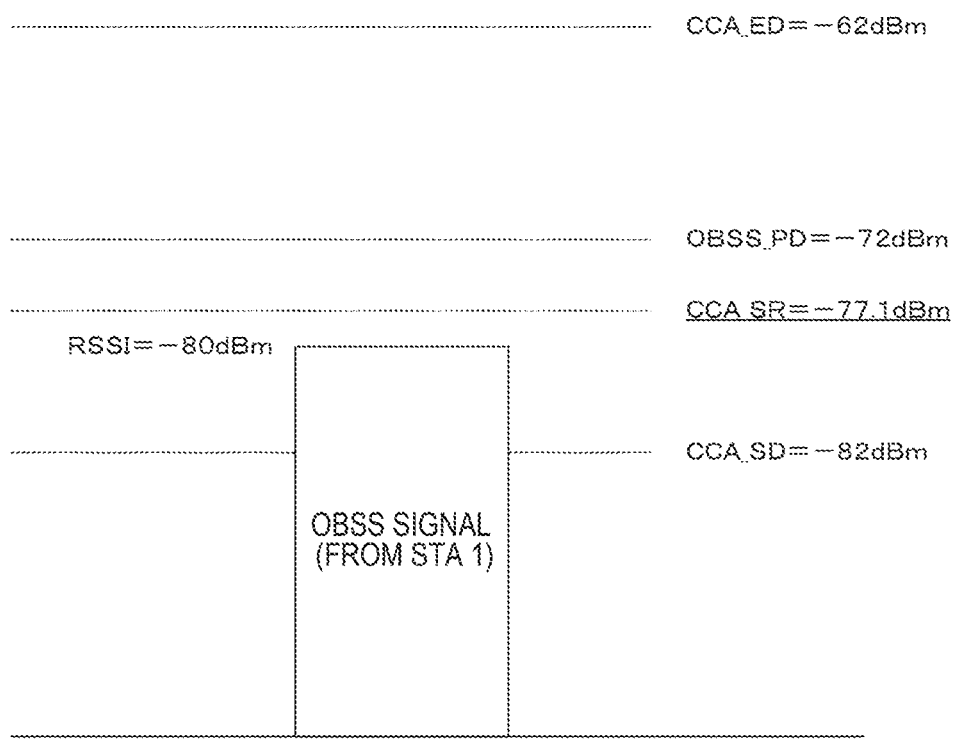
FIG. 8 is a diagram illustrating an example of a threshold for judging whether or not signal transmission is possible in the embodiment of the present technology.

FIG. 8 is a diagram illustrating an example of a threshold for judging whether or not signal transmission is possible in the embodiment of the present technology. In this embodiment, cooperative collision avoidance spatial reuse (CCA_SR), which is a spatial reuse detection threshold, is added as a new signal detection threshold. The CCA_SR is used during a period while an OBSS signal occupies the medium when it is judged using the OBSS_PD that the state is an idle state for the OBSS signal.

A value of the CCA_SR is a relative value with respect to signal strength of the OBSS signal, and is set in accordance with preconditions. As in the example in FIG. 5, in the case where it is assumed that three communication terminals 212, 222 and 223 are arranged at regular intervals with respect to each other and transmit signals at the same power, by a signal from one communication terminal being further added, power becomes double compared to a case where a signal is received from one communication terminal. That is, as the signal strength, "+3.0 dBm" is added. Therefore, by "−77.1 dBm" being set as the CCA_SR, it is possible to detect a state where signal strength of the signals from two communication terminals becomes "−77 dBm" as a busy state.

Figure 9:
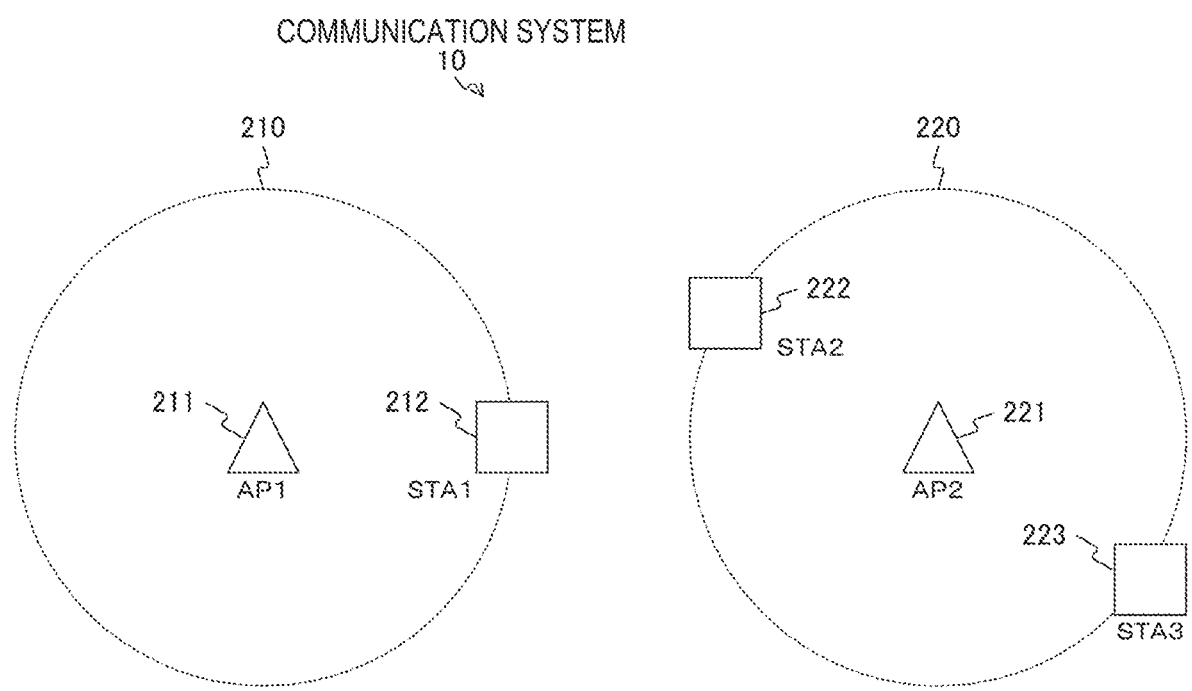
FIG. 9 is a diagram illustrating a second example of the topology in the communication system 10 in the embodiment of the present technology.

FIG. 9 is a diagram illustrating a second example of the topology in the communication system 10 in the embodiment of the present technology. While, in the above-described first example of the topology, it is assumed that the three communication terminals 212, 222 and 223 are arranged at regular intervals with respect to each other and transmit signals at the same power, in this second example, communication terminals within the same network are arranged away from each other. That is, a state is assumed where a distance between the communication terminal #2 (STA 2) 222 and the communication terminal #3 (STA 3) 223 is longer than a distance between the communication terminal #1 (STA 1) 212 and the communication terminal #2 (STA 2) 222.

In this case, if the signal received by the communication terminal #2 (STA 2) 222 from the communication terminal #1 (STA 1) 212 is used as a basis, even if a signal is newly received from the communication terminal #3 (STA 3) 223, power is less than the double. Therefore, in the case where such a situation is assumed, the CCA_SR is set by a value smaller than "+3 dBm" being added to the signal strength received from the communication terminal #1 (STA 1) 212. In this manner, while the value of the CCA_SR is different in accordance with assumed conditions, the value of the CCA_SR remains to be a relative value with respect to the signal strength of the OBSS signal.

[Mechanism for Comparison with Threshold]

Figure 10:
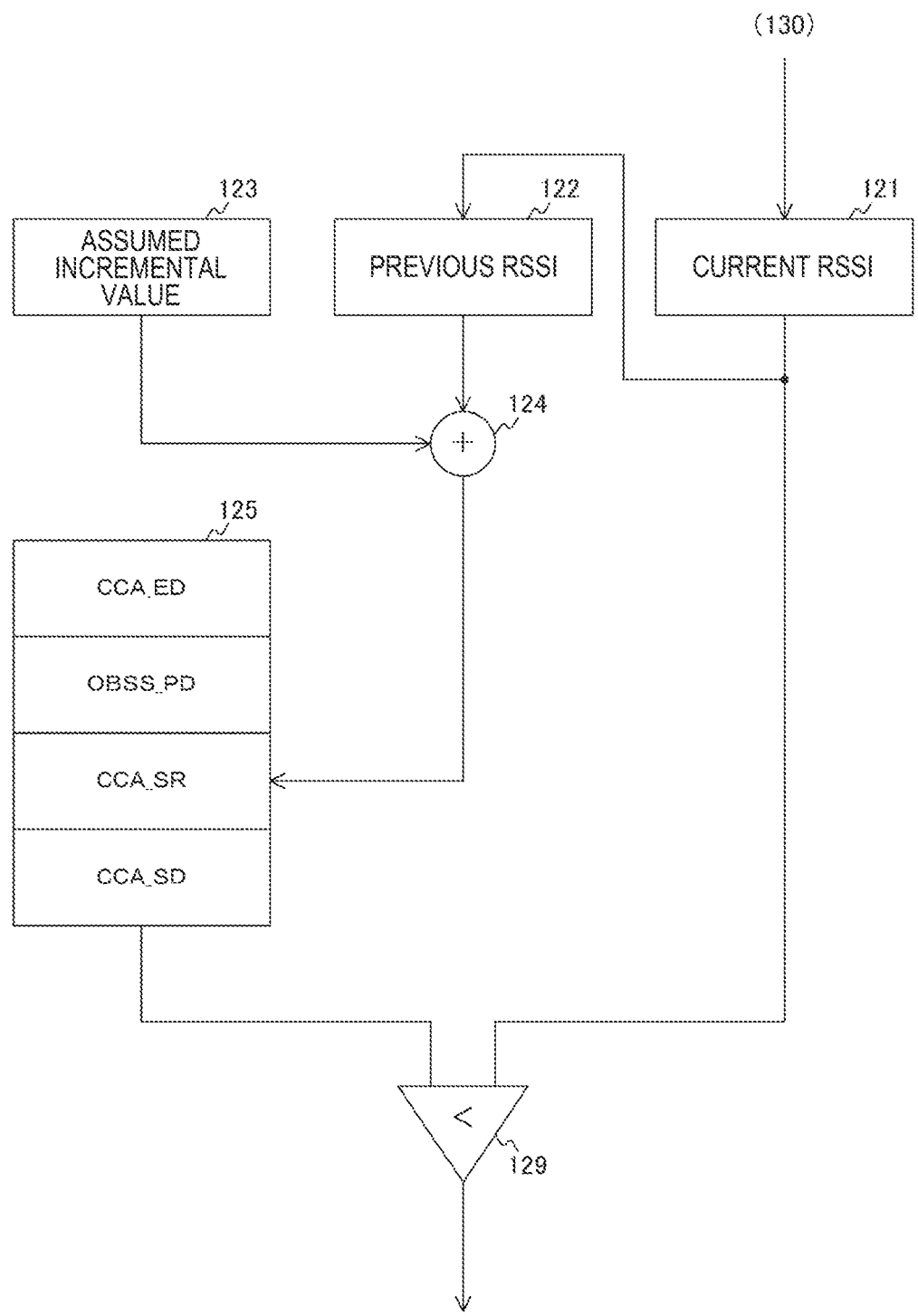
FIG. 10 is a diagram illustrating an example of a mechanism for comparison with a threshold in the embodiment of the present technology.

FIG. 10 is a diagram illustrating an example of a mechanism for comparison with a threshold in the embodiment of the present technology. This comparison mechanism can be realized at the signal processing unit 120.

This comparison mechanism includes a current RSSI holding unit 121, a previous RSSI holding unit 122, an assumed incremental value holding unit 123, an adder 124, a threshold holding unit 125 and a comparator 129.

The current RSSI holding unit 121 holds current signal strength recently measured at the wireless interface unit 130. The previous RSSI holding unit 122 holds past signal strength previously held in the current RSSI holding unit 121. Note that the previous RSSI holding unit 122 is an example of a signal strength holding unit recited in the claims.

The assumed incremental value holding unit 123 holds an incremental value assumed for the signal strength in the case where the signal strength held in the previous RSSI holding unit 122 is signal strength of the OBSS signal. Note that the assumed incremental value holding unit 123 is an example of an assumed incremental value holding unit recited in the claims.

The adder 124 is an adder which adds the signal strength held in the previous RSSI holding unit 122 and the incremental value held in the assumed incremental value holding unit 123. This adder 124 sets the CCA_SR on the basis of the addition result. For example, as in the above-described example, it is assumed that the signal strength held in the previous RSSI holding unit 122 is "−80 dBm", and "+3.0 dBm" is held in the assumed incremental value holding unit 123 to detect a busy state when the same signal strength is further added. In this case, the adder 124 sets "−77.1 dBm" as the CCA_SR so that "−77 dBm" obtained by adding the both is detected as a busy state. However, it is also possible to hold "+2.9 dBm" in the assumed incremental value holding unit 123 and set a value of "−77.1 dBm" obtained by adding "−80 dBm" and "+2.9 dBm" as the CCA_SR. Note that the adder 124 is an example of an adder recited in the claims.

The threshold holding unit 125 holds a threshold with which the signal strength is to be compared. Here, the energy detection threshold CCA_ED, the OBSS threshold OBSS_PD, the spatial reuse detection threshold CCA_SR and the signal detection threshold CCA_SD are held in the threshold holding unit 125. It is assumed that, among these, thresholds other than the CCA_SR are held in the threshold holding unit 125 in advance. Meanwhile, as the CCA_SR, a value generated at the adder 124 as a relative value with respect to the signal strength of the OBSS signal is set.

The comparator 129 is a comparator which compares the threshold held in the threshold holding unit 125 and the signal strength held in the current RSSI holding unit 121. In the case where the signal held in the current RSSI holding unit 121 exceeds one of the thresholds held in the threshold holding unit 125, it is judged that the medium is in a busy state. Which threshold among the thresholds held in the threshold holding unit 125 is referred to differs in accordance with a state of the information processing apparatus.

In normal carrier sense, first, the CCA_SD is referred to, and in the case where the signal strength does not exceed the CCA_SD, it is judged that the state is an idle state. Further, in the case where the signal strength exceeds the CCA_SD, the OBSS_PD is referred to. That is, in the case where the signal is a signal from another network, and signal strength of the OBSS signal does not exceed the OBSS_PD, it is judged that the state is an idle state. In this event, the CCA_SR is generated on the basis of the signal strength of the OBSS signal and held in the threshold holding unit 125, and, thereafter, the CCA_SR is referred to during a period while the OBSS signal occupies the medium, and it is judged that the state is an idle state if the signal strength does not exceed the CCA_SR.

[Frame Format]

Figure 11:
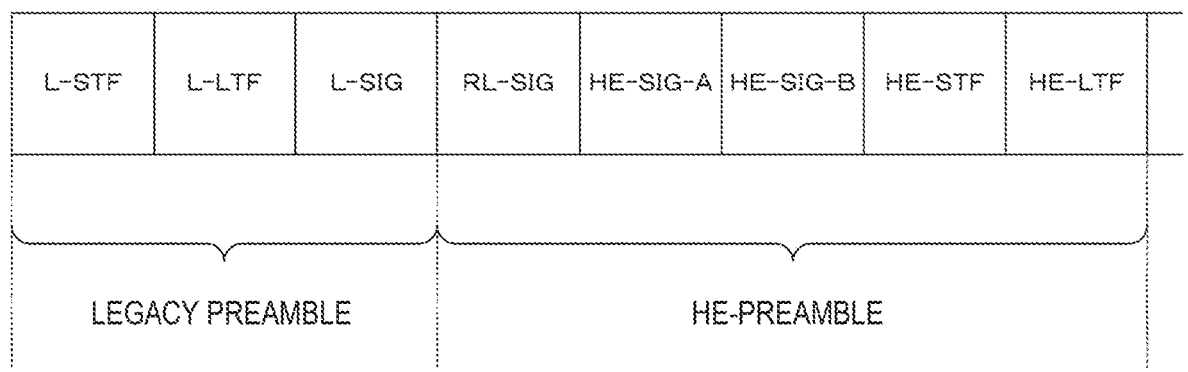
FIG. 11 is a diagram illustrating a field format of a PPDU frame in IEEE 802.11ax standards assumed in the embodiment of the present technology.

FIG. 11 is a diagram illustrating a field format of a PLCP protocol data unit (PPDU) frame of IEEE 802.11ax standards assumed in the embodiment of the present technology. While work for studying IEEE 802.11ax standards is under way, and content of the standards is not fixed, description will be provided here while referring to published information which is being studied. Note that the published information of IEEE 802.11ax standards is available from the following URL.

http://mentor.ieee.org/802.11/documents

This frame has a legacy preamble and an HE-preamble as preambles. The legacy preamble is a preamble for maintaining compatibility with a previous IEEE 802.11 device. The HE-preamble is a preamble in IEEE 802.11ax standards (HE: high-efficiency).

The legacy preamble includes an L-STF, an L-LTF and an L-SIG. The legacy short training field (L-STF) and the legacy long training field (L-LTF) are fields for performing synchronization processing. The legacy signal field (L-SIG) is a field including information such as a transfer rate and a packet length.

The HE-preamble includes an RL-SIG, an HE-SIG-A, an HE-SIG-B, an HE-STF and an HE-LTF. The repeated legacy signal field (RL-SIG) is a field including content similar to the L-SIG in the legacy preamble. The high efficiency signal A field (HE-SIG-A) is a filed including information useful for a third party which intercepts the signal. The high efficiency signal B field (HE-SIG-B) is a field including information useful for a user who is a destination of the signal. The high efficiency short training field (HE-STF) and the high efficiency long training field (HE-LTF) are fields for performing synchronization processing.

Figure 12:
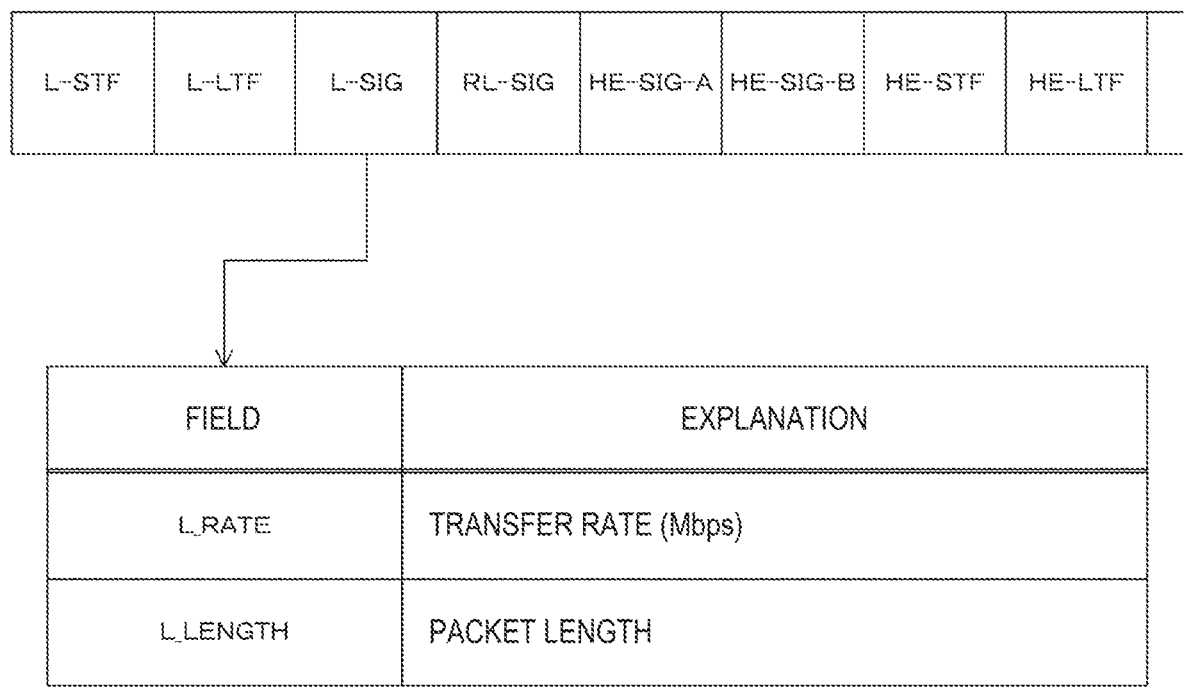
FIG. 12 is a diagram illustrating a field format of an L-SIG in IEEE 802.11ax standards assumed in the embodiment of the present technology.

FIG. 12 is a diagram illustrating a field format of the L-SIG in the IEEE 802.11ax standards assumed in the embodiment of the present technology. This L-SIG includes an L-RATE and an L-LENGTH.

The L-RATE is a field indicating a transfer rate (Mbps). The L-LENGTH is a field indicating a packet length. Therefore, a value obtained by dividing the latter by the former "L-LENGTH/L-RATE" indicates a period during which a packet signal of this frame occupies a medium (medium occupation period: PPDU length). In this embodiment, when it is judged that the state is an idle state by the OBSS_PD for the OBSS signal, the signal strength is judged using the CCA_SR as a threshold during a period while the OBSS signal occupies the medium.

FIG. 13 is a diagram illustrating a field format of the HE-SIG-A in the IEEE 802.11ax standards assumed in the embodiment of the present technology.

"DL/UL" is a field indicating a link direction as to whether a link is a downlink (a link from the access point to the terminal apparatus) or an uplink (a link from the terminal apparatus to the access point). "Format" is a field indicating whether a type of the PPDU format is "SU PPDU" or "Trigger-based UL PPDU". "BSS Color" is a field indicating a BSS identifier of a network. "Spatial Reuse" is a field indicating spatial reuse information.

"TXOP Duration" is a field indicating a remaining period of a channel occupation period. "Bandwidth" is a field indicating a bandwidth. The MCS is a field indicating an index of a modulation and coding scheme. "CP+LTF Size" is a field indicating a size of a cyclic prefix (CP) and a long training field (LTF). "Coding" is a field indicating a coding rate.

"Nsts" is a field indicating the number of sts (space-time streams). "STBC" is a field indicating whether or not space-time block coding is performed. "TxBF" is a field indicating whether or not transmission beamforming is performed. "DCM" is a field indicating whether or not dual carrier modulation (DCM) is performed. "Packet Extension" is a field indicating a packet extension. "Beam Change" is a field indicating whether or not there is change of a pre-decoder between the L-LTF and the HE-LTF. "Doppler" is a field indicating whether or not there is Doppler resistance.

Among these fields, "BSS Color" is referred to in order to determine whether the signal received at the information processing apparatus is a signal of another adjacent network or a signal in the own network. In this embodiment, in the case where the received signal is a signal of another network, comparison is performed using a threshold of the OBSS_PD.

[Operation]

Figure 14:
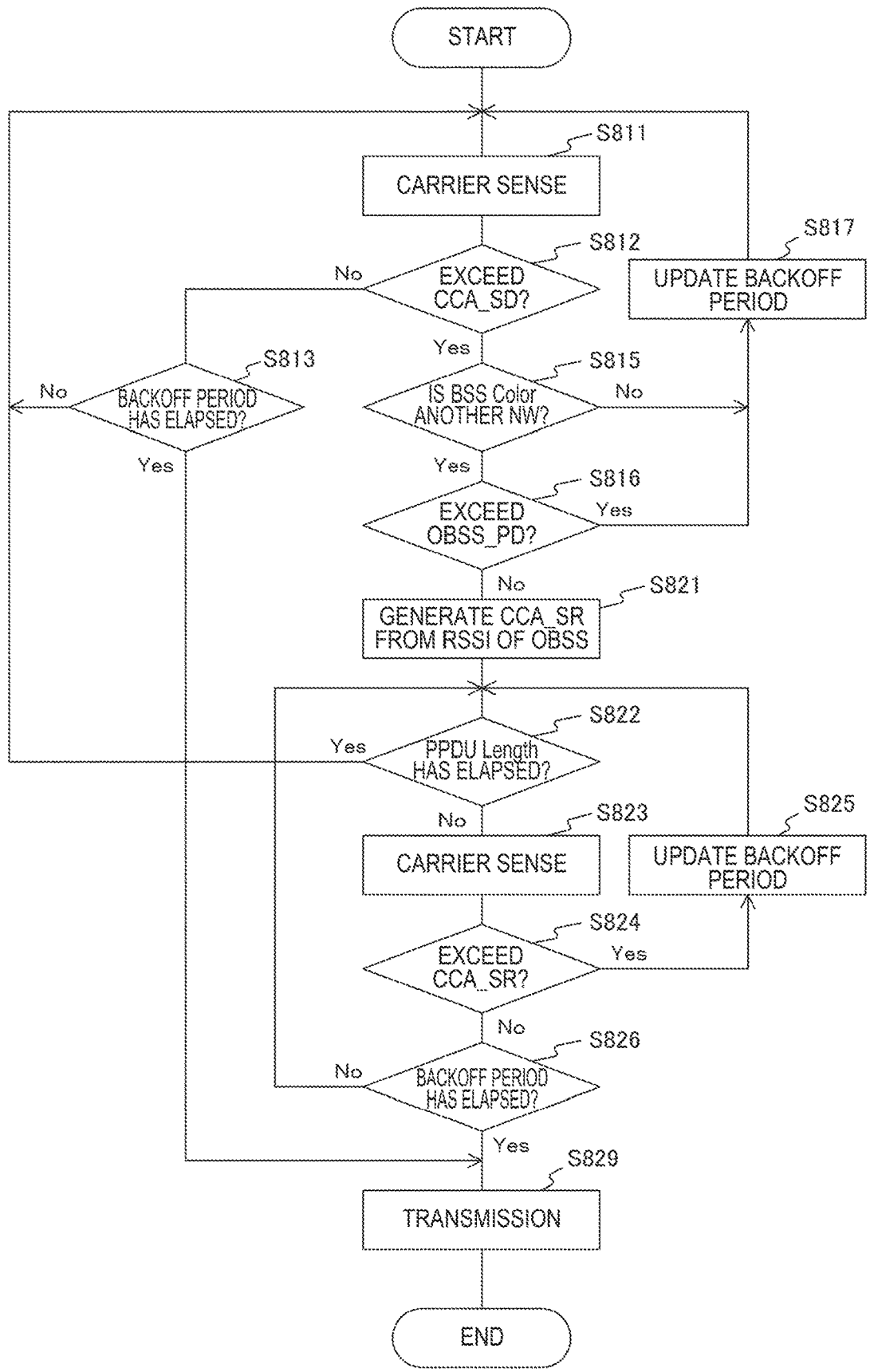
FIG. 14 is a flowchart illustrating an example of processing procedure at the information processing apparatus 100 in the embodiment of the present technology.

FIG. 14 is a flowchart illustrating a processing procedure example at the information processing apparatus 100 in the embodiment of the present technology. Each of the information processing apparatuses 100 confirms whether the medium is in an idle state or in a busy state by performing carrier sense prior to signal transmission (step S811). Signal strength of the signal received through carrier sense is held in the current RSSI holding unit 121. The information processing apparatus 100 compares the signal strength of the received signal with the CCA_SD held in the threshold holding unit 125 by the comparator 129, and, if the signal strength of the received signal does not exceed the CCA_SD (step S812: No), judges that the state is an idle state. Each of the information processing apparatuses 100 includes a backoff counter, and continues countdown if the state is an idle state, and if the backoff counter becomes zero (step S813: Yes), starts transmission operation (step S829).

In the case where the signal strength of the received signal exceeds the CCA_SD (step S812: Yes), as a result of referring to "BSS Color" of the HE-SIG-A of the signal, if the BSS identifier matches the BSS identifier of the information processing apparatus (step S815: No), the information processing apparatus 100 judges that the state is a busy state. If the state is a busy state, the information processing apparatus 100 updates a backoff period of the backoff counter (step S817), and performs carrier sense again (step S811).

If "BSS Color" does not match the BSS identifier of the information processing apparatus (step S815: Yes), it is determined that the signal is a signal from another adjacent network (OBSS signal). In this case, the information processing apparatus 100 compares signal strength of the OBSS signal with the OBSS_PD held in the threshold holding unit 125 by the comparator 129. Then, if the signal strength of the OBSS signal does not exceed the OBSS_PD (step S816: No), it is judged that the state is an idle state. Meanwhile, if the signal strength of the OBSS signal exceeds the OBSS_PD (step S816: Yes), it is judged that the state is a busy state. If the state is a busy state, the information processing apparatus 100 updates the backoff period of the backoff counter (step S817) and performs carrier sense (step S811).

In the case where it is judged in step S816 that the state is an idle state, the CCA_SR is generated by an incremental value held in the assumed incremental value holding unit 123 being added to the signal strength of the OBSS signal held in the previous RSSI holding unit 122 (step S821). After that, this CCA_SR is used as a threshold for judging whether or not signal transmission is possible (step S824). However, this CCA_SR is used during a period while the OBSS signal occupies the medium. Therefore, after the period (PPDU length) has elapsed (step S822: Yes), the CCA_SD is used as a threshold again (step S812).

During a period while the OBSS signal occupies the medium (step S822: No), the information processing apparatus 100 compares the signal strength of the signal received through carrier sense (step S823) with the CCA_SR held in the threshold holding unit 125 by the comparator 129. Then, if the signal strength of the received signal does not exceed the CCA_SR (step S824: No), the information processing apparatus judges that the state is an idle state. The information processing apparatus 100 continues countdown if the state is an idle state, and if the backoff counter becomes zero (step S826: Yes), starts transmission operation (step S829).

Meanwhile, if the signal strength exceeds the CCA_SR (step S824: Yes), it is judged that the state is a busy state. If the state is a busy state, the information processing apparatus 100 updates the backoff period of the backoff counter (step S825) and performs carrier sense (step S823).

Note that, while, in the above-described example, it is judged that the state is a busy state in the case where the signal strength exceeds the threshold, it is also possible to judge that the state is a busy state in the case where the signal strength is equal to or greater than the threshold and judge that the state is an idle state in the case where the signal strength does not reach the threshold. In either case, technical idea is the same in a point that whether or not signal transmission is possible is judged using a threshold.

In this manner, according to the embodiment of the present technology, it is possible to appropriately perform spatial reuse by judging signal strength using a spatial reuse detection threshold CCA_SR while an OBSS signal is received.

2. Application Examples

The technology according to the present disclosure can be applied to various products. For example, the information processing apparatus 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the information processing apparatus 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the information processing apparatus 100 may be wireless communication modules mounted in such terminals (for example, integrated circuit modules configured by one die).

Further, the information processing apparatus 100 may be realized as a wireless LAN access point (also referred to as a wireless base station) which has a router function or does not have a router function. The information processing apparatus 100 may be realized as a mobile wireless LAN router. The information processing apparatus 100 may also be a wireless communication module (for example, an integrated circuit module configured with one die) mounted on such devices.

2-1. First Application Example

Figure 15:
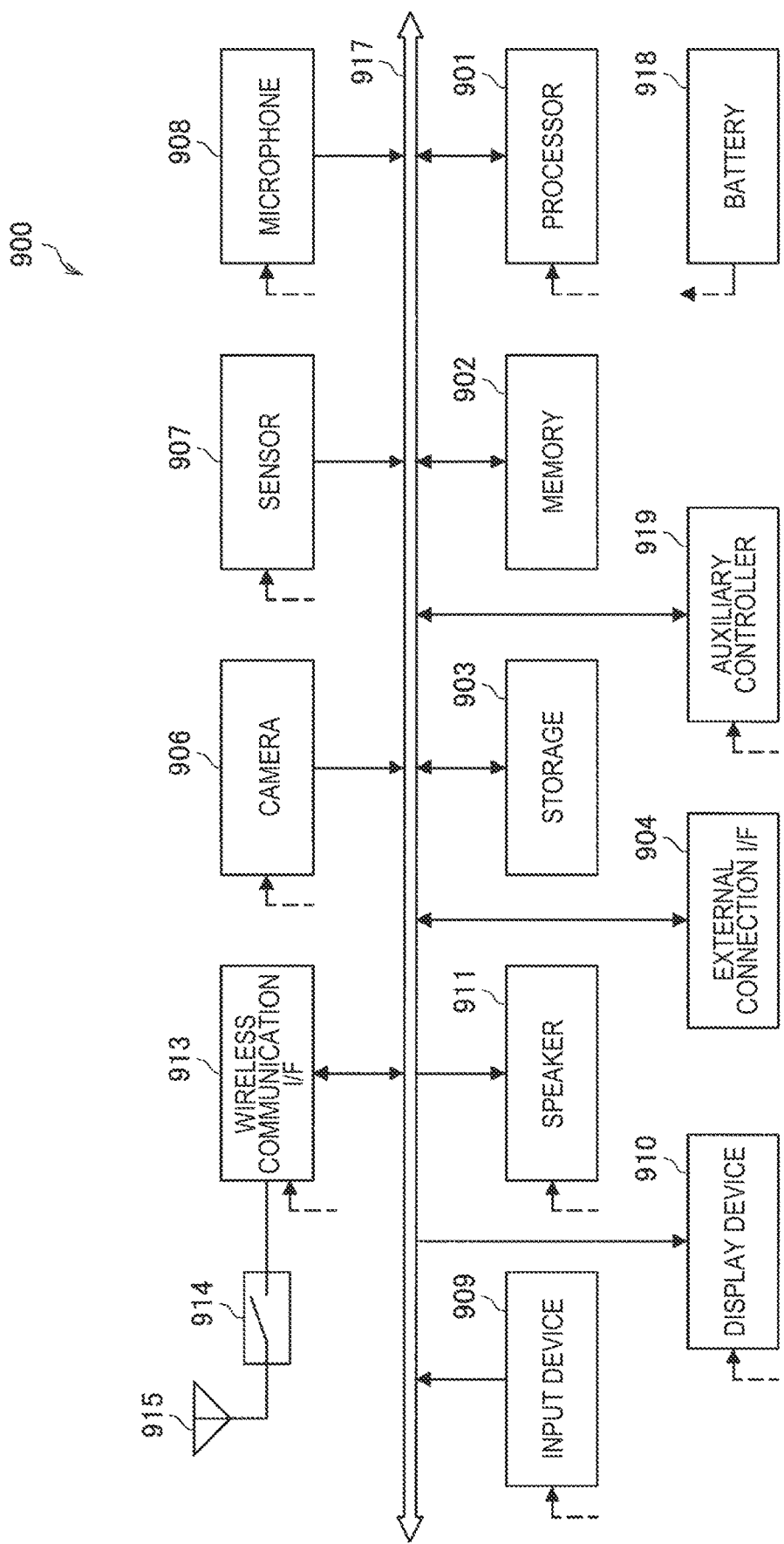
FIG. 15 is a block diagram illustrating an example of a schematic configuration of a smartphone.

FIG. 15 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad, 11ax, and the like to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct. Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 15. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 15 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 15, the wireless interface unit 130 described with reference to FIG. 2 may be mounted on the wireless communication interface 913. In addition, at least some of these functions may be mounted on the processor 901 or the auxiliary controller 919.

Note that the smartphone 900 may operate as a wireless access point (software AP) as the processor 901 executes the function of an access point at an application level. In addition, the wireless communication interface 913 may have the function of a wireless access point.

2-2. Second Application Example

Figure 16:
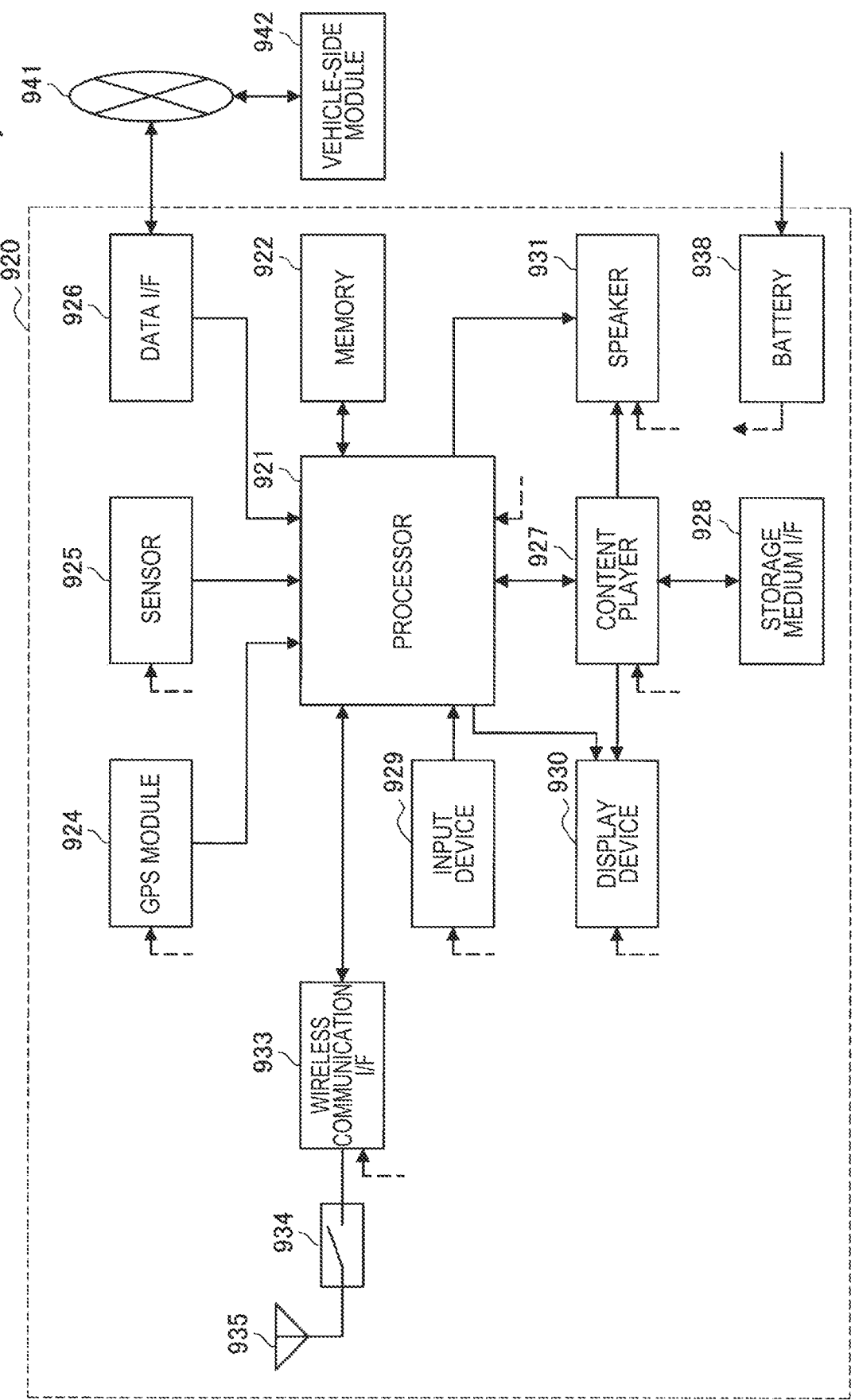
FIG. 16 is a block diagram illustrating an example of a schematic configuration of a car navigation device.

FIG. 16 is a block diagram illustrating an example of a schematic configuration of a car navigation device 920 to which the technology of the present disclosure can be applied. The car navigation device 920 includes a processor 921, a memory 922, a GPS module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, 11ax, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 16. In this case, the antenna switch 934 may be omitted from the configuration of the car navigation device 920.

The battery 938 supplies electric power to each of the blocks of the car navigation device 920 illustrated in FIG. 16 via power supply lines partially indicated by dashed lines in the drawing. In addition, the battery 938 accumulates electric power supplied from the vehicle side.

In the car navigation device 920 illustrated in FIG. 16, the wireless interface unit 130 described with reference to FIG. 2 may be mounted on the wireless communication interface 933. In addition, at least some of these functions may be mounted on the processor 921.

In addition, the wireless communication interface 933 may operate as the information processing apparatus 100 described above, and provide wireless communication for a terminal of a user on the vehicle.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

2-3. Third Application Example

Figure 17:
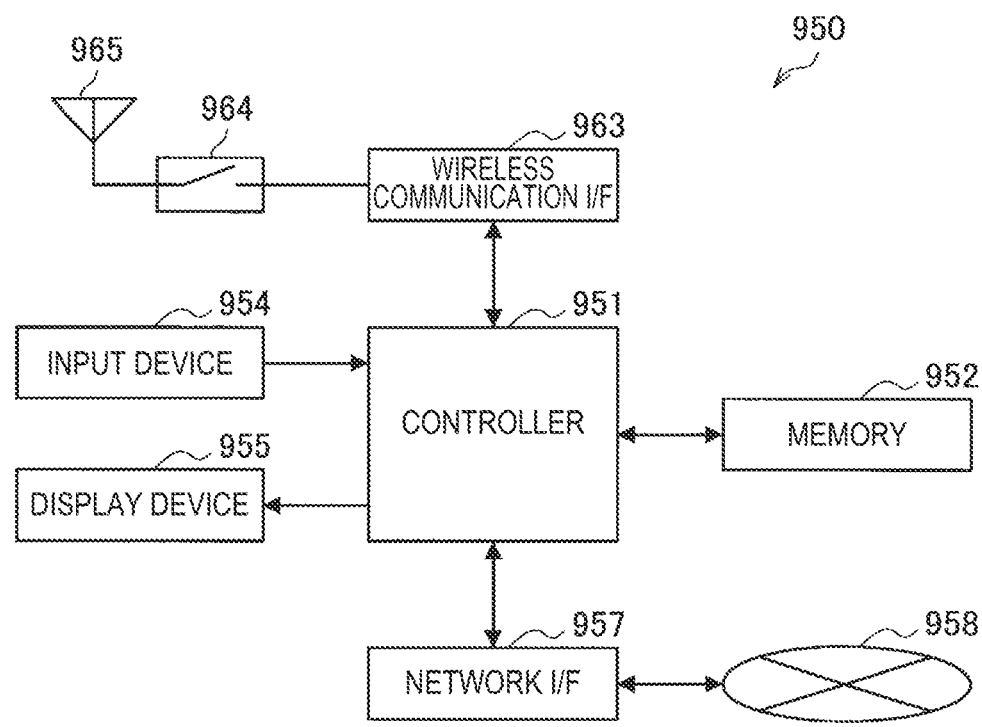
FIG. 17 is a block diagram illustrating an example of a schematic configuration of a wireless access point.

FIG. 17 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, 11ax, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 17, the wireless interface unit 130 described with reference to FIG. 2 may be mounted on the wireless communication interface 963. In addition, at least some of these functions may be mounted on the controller 951.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not limiting but are merely examples, and there may be other effects.

Additionally, the present technology may also be configured as below.

(1)
An information processing apparatus including:
a judging unit configured to judge whether or not later signal transmission is possible using a relative value with respect to signal strength of a received signal as a threshold.

(2)
The information processing apparatus according to (1),
in which the signal strength is signal strength of a signal from another network.

(3)
The information processing apparatus according to (1),
in which the signal strength is signal strength in a case where a signal from another network does not exceed predetermined strength.

(4)
The information processing apparatus according to (1),
in which the relative value with respect to the signal strength of the received signal is a value for detecting signal strength in a case where it is assumed that a signal from within an own network is added to signal strength of a signal from another network.

(5)
The information processing apparatus according to (4),
in which the judging unit includes
a signal strength holding unit configured to hold the signal strength of the signal from the other network,
an assumed incremental value holding unit configured to hold an incremental value assumed as signal strength of the signal from within the own network, and
an adding unit configured to add the signal strength of the signal from the other network held in the signal strength holding unit and the incremental value held in the assumed incremental value holding unit to generate the threshold.

(6)
The information processing apparatus according to (1),
in which the judging unit judges whether or not signal transmission is possible using the relative value as a threshold during a period while a signal from another network occupies a medium.

(7)
The information processing apparatus according to (1),
in which, in a case where the signal strength of the received signal exceeds a first threshold and a network identifier included in the received signal indicates another network, if the signal strength of the received signal does not exceed a second threshold, the judging unit judges whether or not signal transmission is possible using a relative value with respect to the signal strength of the received signal as the threshold while the signal is received.

(8)
An information processing apparatus including:
a measuring unit configured to measure signal strength of a received signal;
a judging unit configured to judge whether or not later signal transmission is possible using a relative value with respect to the measured signal strength as a threshold; and
a control unit configured to control signal transmission in accordance with the judgement.

(9)
A signal transmission control method including:
a step of acquiring signal strength of a received signal by a measuring unit;
a step of generating a relative value with respect to the signal strength as a threshold by a threshold generating unit; and
a step of judging whether or not signal transmission is possible using the threshold by a judging unit.

REFERENCE SIGNS LIST

10 communication system
100 information processing apparatus
110 data processing unit
120 signal processing unit
121 current RSSI holding unit
122 previous RSSI holding unit
123 assumed incremental value holding unit
124 adder
125 threshold holding unit
129 comparator
130 wireless interface unit
140 antenna
150 storage unit
160 control unit
210, 220 network
211, 221 access point
212, 222, 223 communication terminal

The invention claimed is:

1. An information processing apparatus comprising:
circuitry configured to
determine a signal strength of a first signal received from a first apparatus in a first network based on a first signal threshold, the first network being a network which the information processing apparatus belongs to;
determine a signal strength of a second signal received from a second apparatus in a second network which is different from the first network, based on a second signal threshold, the second signal threshold being used for overlapping network;
generate a third signal threshold by using a relative value and the signal strength of the second signal received from the second network, the relative value being set in accordance with a relative position between the information processing apparatus, the first apparatus and the second apparatus, when a signal state of the second signal is determined as an idle based on the second signal threshold; and determine the signal strength of the second signal based on the third signal threshold to judge whether to allow signal transmission, only during a medium occupation period while the second signal from the second network occupies a medium, the circuitry is further configured to change the third signal threshold to another threshold after the medium occupation period of the second signal has expired.

2. The information processing apparatus according to claim 1,
wherein the relative value is a value for detecting signal strength in a case where the signal strength of the first signal from the first network is added to the second signal strength of the second signal from the second network.

3. The information processing apparatus according to claim 2,
wherein the circuitry if further configured to
hold the signal strength of the second signal from the second network,
hold an incremental value assumed as signal strength of the first signal from the first network, and
add the signal strength of the second signal from the second network and the incremental value to generate the third signal threshold.

4. The information processing apparatus according to claim 1,
wherein, in a case where the signal strength of the second signal exceeds the first signal threshold and a network identifier included in the received signal indicates the second network, if the signal strength of the second signal does not exceed the second signal threshold, the circuitry judges whether to allow signal transmission based on the third signal threshold while the second signal is received.

5. An information processing apparatus comprising:
circuitry configured to
measure signal strength of a received signal based on a first signal threshold or a second signal threshold, the first signal threshold being for a first signal from a first apparatus in a first network which the information processing apparatus belongs to, and the second signal threshold being for a second signal from a second apparatus in a second network which is different from the first network;
judge whether to allow signal transmission based on a third signal threshold, the third signal threshold being generated by using a relative value and the signal strength received from the second network, when a signal state of the second signal is determined as an idle based on the second signal threshold, the relative value being set in accordance with a relative position between the information processing apparatus, the first apparatus and the second apparatus; and
control signal transmission in accordance with the judgment, only during a medium occupation period while the second signal from the second network occupies a medium, the circuitry is further configured to switch the third signal threshold to another threshold after the medium occupation period of the second period has expired.

6. A signal transmission control method comprising:
determining a signal strength of a first signal received from a first apparatus in a first network based on a first signal threshold, the first network being a network which the information processing apparatus belongs to;
determining a signal strength of a second signal received from a second apparatus in a second network which is different from the first network, based on a second signal threshold, the second signal threshold being used for overlapping network;
generating a third signal threshold by using a relative value and the signal strength of the second signal received from the second network, the relative value being set in accordance with a relative position between the information processing apparatus, the first apparatus and the second apparatus, w % ben a signal state of the second signal is determined as an idle based on the second signal threshold; and
determining the signal strength of the second signal based on the third signal threshold to judge whether to allow signal transmission, only during a medium occupation period while the second signal from the second network occupies a medium, and switching the third signal threshold to another threshold after the medium occupation period of the second period has expired.

7. The information processing apparatus according to claim 1, wherein the first signal threshold is CCA_SD (Cooperative Collision Avoidance Signal Detect).

8. The information processing apparatus according to claim wherein the second signal is OBSS (Overlapping Basic Service Set) signal, and the second signal threshold is OBSS_PD (Overlapping Basic Service Set Packet Detect).

9. The information processing apparatus according to claim 8, wherein the third signal threshold is CCA_SR (Cooperative Collision Avoidance Signal Spatial Reuse), in which a value of CCA_SR is a relative value with respect to the signal strength of the OBSS signal.

* * * * *